United States Patent
Tsai

(10) Patent No.: US 8,641,190 B2
(45) Date of Patent: Feb. 4, 2014

(54) GLASSES WITH SAFETY DEVICE AND THREE-DIMENSIONAL GLASSES WITH SAFETY DEVICE

(75) Inventor: Tung-Chi Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/402,934

(22) Filed: Feb. 23, 2012

(65) Prior Publication Data

US 2013/0003012 A1 Jan. 3, 2013

(30) Foreign Application Priority Data

Jun. 30, 2011 (TW) .............................. 100123226 A

(51) Int. Cl.
*G02C 5/22* (2006.01)
*G02C 5/14* (2006.01)

(52) U.S. Cl.
CPC .............. *G02C 5/2254* (2013.01); *G02C 5/146* (2013.01)
USPC .......................................... 351/153; 16/228

(58) Field of Classification Search
CPC ..... G02C 5/2209; G02C 5/2254; G02C 5/146
USPC ........... 351/41, 111, 116, 119, 121, 153, 158, 351/44; 16/228
See application file for complete search history.

(56) References Cited

U.S. PATENT DOCUMENTS

| | | | | |
|---|---|---|---|---|
| 5,144,344 A | * | 9/1992 | Takahashi et al. | 351/44 |
| 6,099,120 A | * | 8/2000 | De Lima | 351/153 |
| 6,427,254 B1 | * | 8/2002 | Gardner | 2/444 |
| 7,703,913 B2 | * | 4/2010 | Huang | 351/110 |
| 8,192,017 B2 | * | 6/2012 | Chen | 351/153 |

FOREIGN PATENT DOCUMENTS

| | | |
|---|---|---|
| TW | M368081 | 11/2009 |
| TW | M390467 | 10/2010 |

* cited by examiner

*Primary Examiner* — Huy K Mai
(74) *Attorney, Agent, or Firm* — Altis Law Group, Inc.

(57) ABSTRACT

A pair of the 3D glasses having safety device comprises a glasses frame and a pair of temples pivotally mounted on the glasses frame. Each of the pair of temples comprises a joint extreme having a pivot seat with an axle bore and an aperture connecting to the axle bore. The pair of temples is capable of being dislocated from the glasses frame.

19 Claims, 5 Drawing Sheets

GLASSES WITH SAFETY DEVICE AND THREE-DIMENSIONAL GLASSES WITH SAFETY DEVICE

TECHNICAL FIELD

The disclosure relates to a pair of three-dimensional glasses with safety device.

DESCRIPTION OF THE RELATED ART

As three-dimensional (3D) videos have become more popular, 3D glasses for watching these 3D videos are used increasingly. Thermoplastic materials are widely used to manufacture the 3D glasses. However, these materials may be brittle after being cured and may be a hazard to the user. Moreover, an articulate portion between a glasses frame and a pair of temples of the 3D glasses restricts a swing radian of the temple in a constant range. Since the pair of temples swings outward to an extremity, users can slip their head through an interval between the two temples and wear the 3D glasses on their face by hanging the pair of temples on their ears. However, when the swing radian of the temple exceeds the extremity of outward pivot, the temple may burst or snap and cut the user. Hence, a new designed 3D glasses having safety device is required.

DETAILED DESCRIPTION

Exemplary embodiments of the disclosure will be described with reference to the accompanying drawings.

Figure 1:
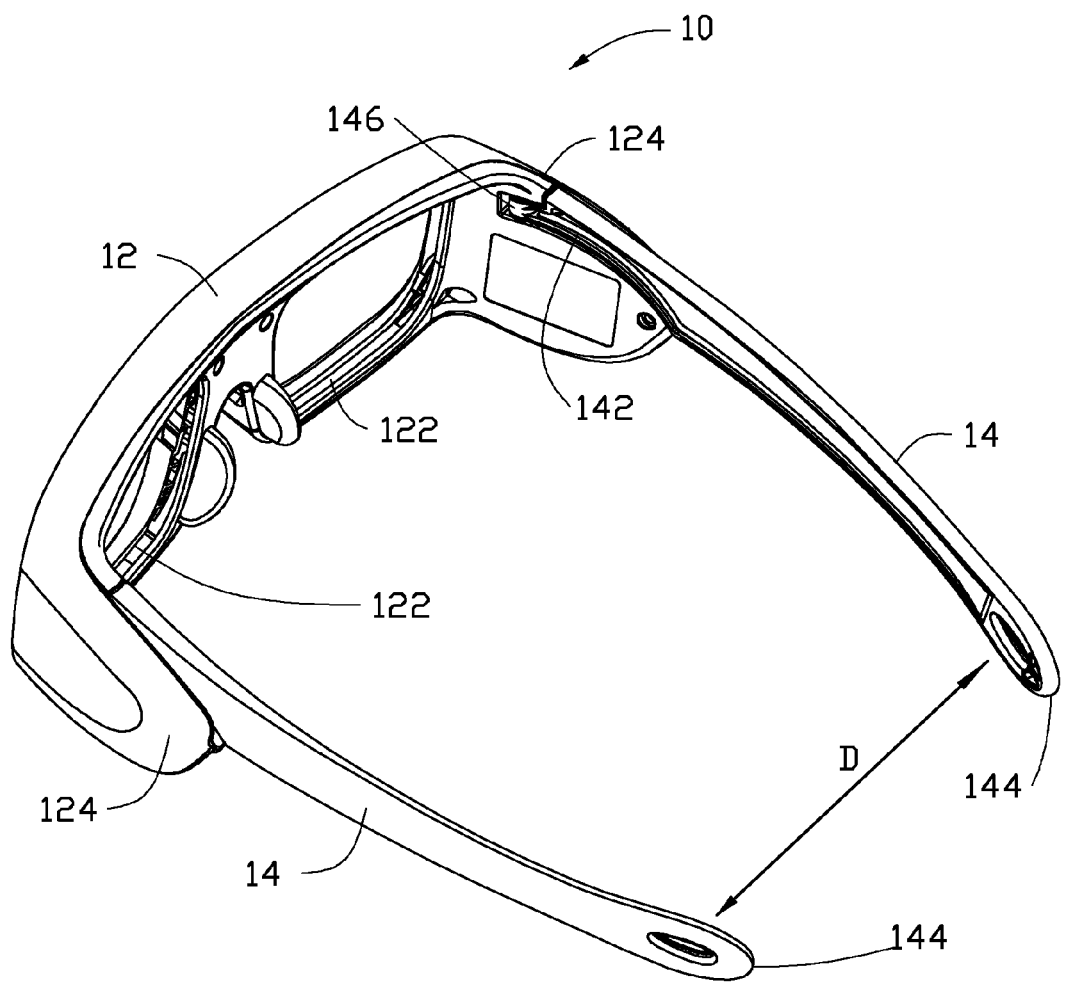
FIG. 1 is a schematic diagram of an embodiment of a pair of 3D glasses of the disclosure.

Referring to FIG. 1, the disclosure provides a pair of 3D glasses 10 comprising a glasses frame 12 and a pair of temples 14. In the embodiment, the glasses frame 12 and the pair of temples 14 are made of thermoplastic materials.

The glasses frame 12 comprises two racks 122 and two articulate portions 124 adjacent to the two racks 122, wherein the two articulate portions 124 respectively extend from two ends of the glasses frame 12 to form a U-shaped structure. The two racks 122 are configured to install a pair of lenses (not labeled). In the embodiment, the pair of lenses is 3D lenses for users watching 3D videos. The pair of temples 14 is pivotally mounted on the two articulate portions 124 so as to be allowed to fold inward or unfold outward. While the pair of temples 14 is pivoted inward in the vicinity of the two racks 122, the pair of temples 14 is received inside the glasses frame 12 between the two articulate portions 124. Otherwise, while the pair of temples 14 is pivoted outward in the vicinity of the articulate portion 124, an interval D is formed between the pair of temples 14. Thus, a user is able to slip his/her head through the interval D and wear the 3D glasses 10 on his/her face by hanging the pair of temples 14 on his/her ears. Therefore the user can watch 3D videos through the pair of 3D lenses installed in the two racks 122. Moreover, each the pair of temples 14 comprises a joint extreme 142 and a hanging extreme 144 opposite to the joint extreme 142. The joint extreme 142 is pivotally mounted on the articulate 124 by an axle 126 (see FIG. 2) such that the temple 14 is allowed to be pivoted on the glasses frame 12. The hanging extreme 144 is configured to hang the two temples 14 on the ears of the user.

Figure 2:
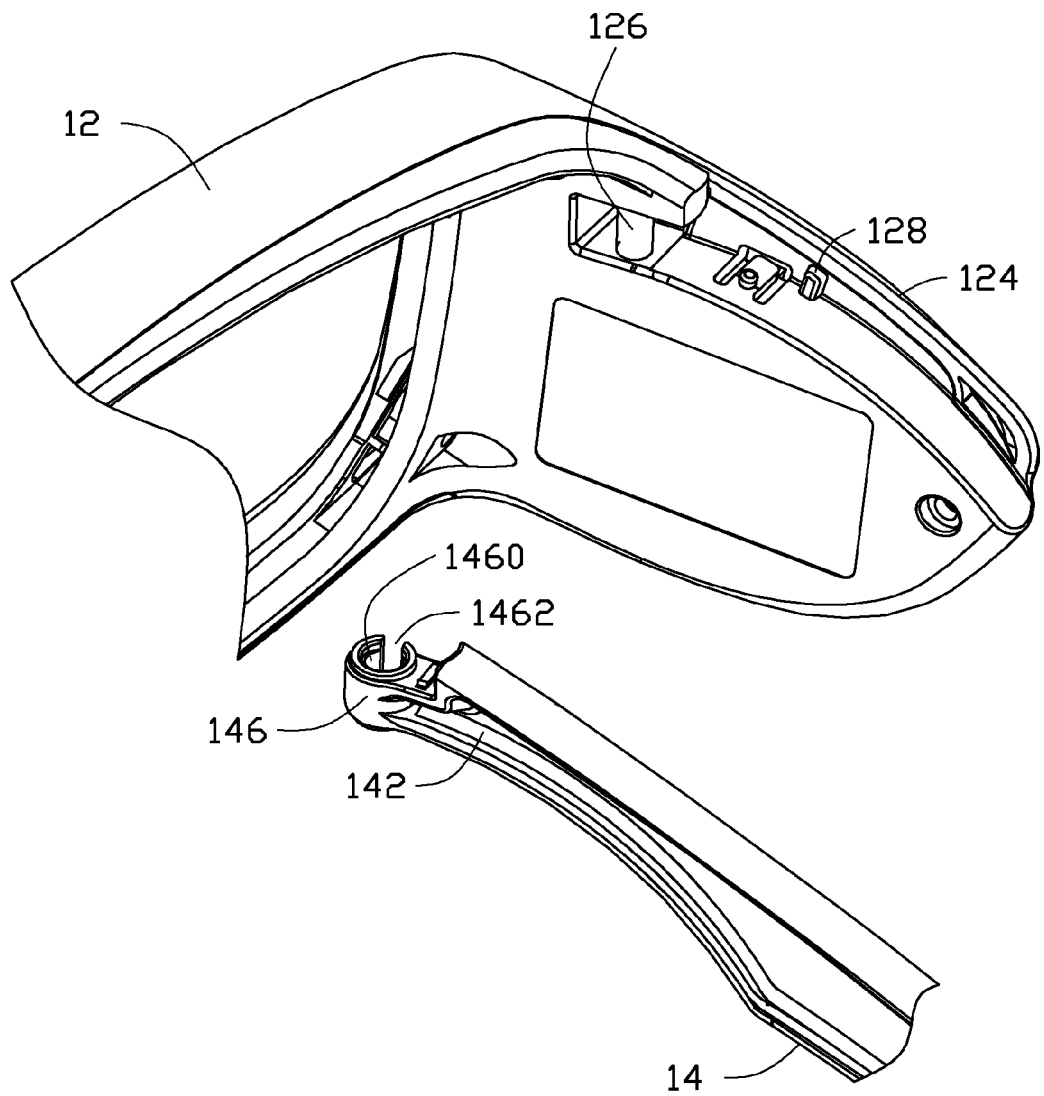
FIG. 2 is an explosive diagram of an articulate portion and a joint extreme of a temple of the 3D glasses of FIG. 1.
Figure 3:
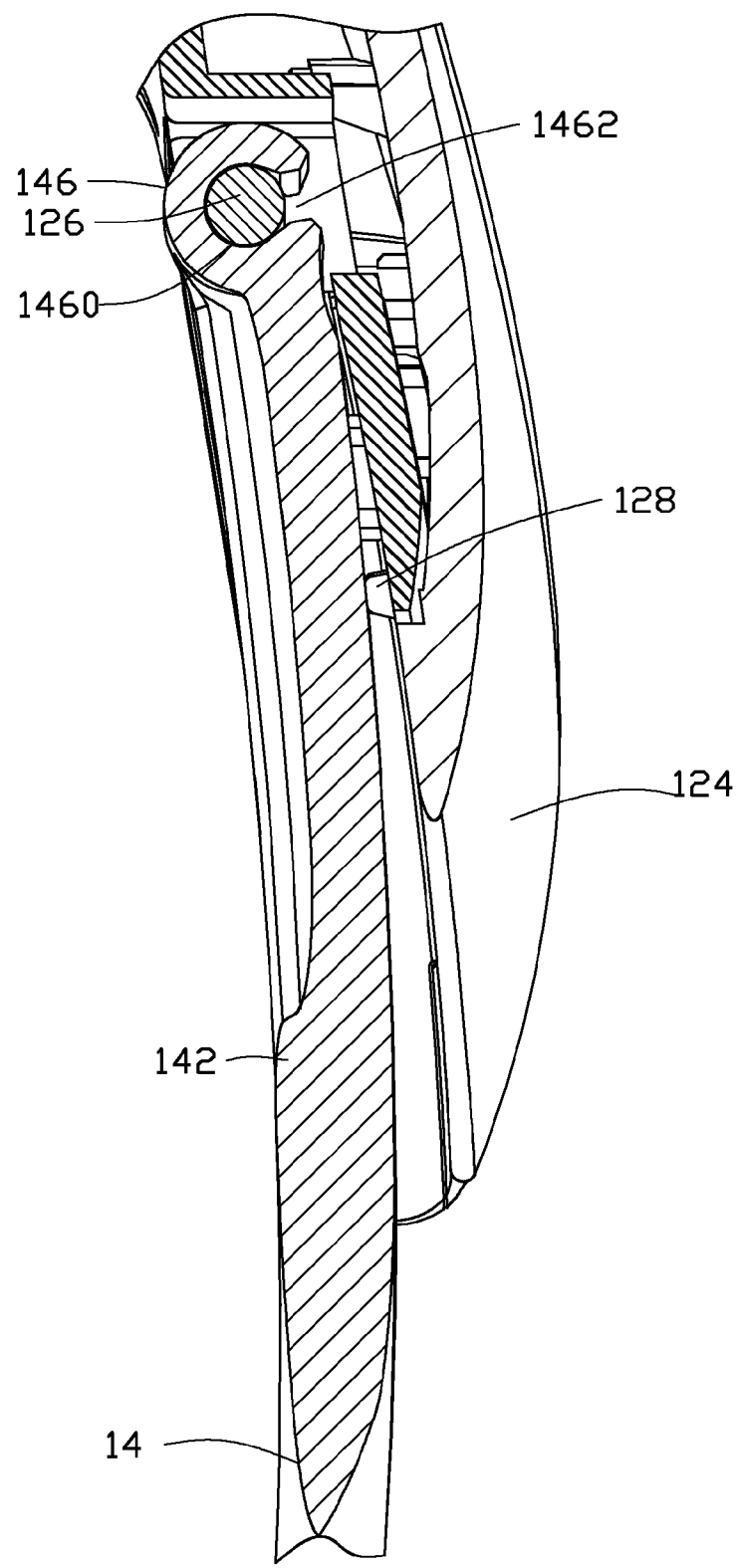
FIG. 3 is a cross section of the temple and the articulate portion of the 3D glasses of FIG. 1.

Referring to FIG. 2, the joint extreme 142 comprises a pivot seat 146 having an axle bore 1460 and an aperture 1462, wherein the aperture 1462 connects to the axle bore 1460 and faces to the articulate portion 124. The axle bore 1460 is engaged with the axle 126 to couple with the articulate portion 124, and the pair of temples 14 is able to fold on the two articulate portions 124 between the glasses frame 12 and the two articulate portions 124. In the embodiment, the pivot seat 146 is flexible so that the axle 126 is allowed to be inserted into the axle bore 1460 through the aperture 1462, as shown in FIG. 3. The aperture 1462 is smaller than a diameter of the axle 126 therefore the axle 126 can be engaged with the pivot seat 146. For assembly, it is easy to fabricate the pair of temples 14 and the glasses frame 12 into the pair of 3D glasses, moreover processing time and cost thereof is also reduced.

Figure 4:
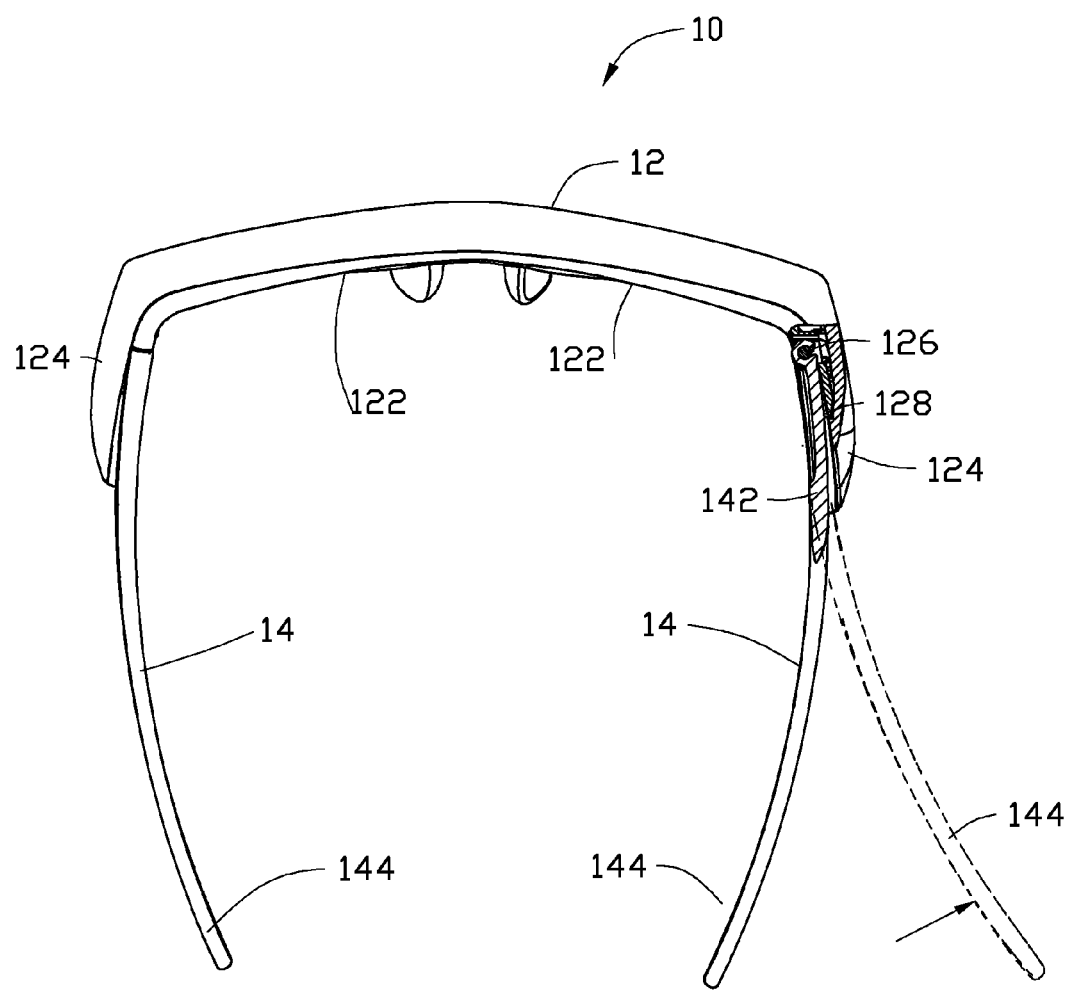
FIG. 4 is a schematic diagram showing a situation of excess swing for the temple of the 3D glasses of FIG. 1.
Figure 5:
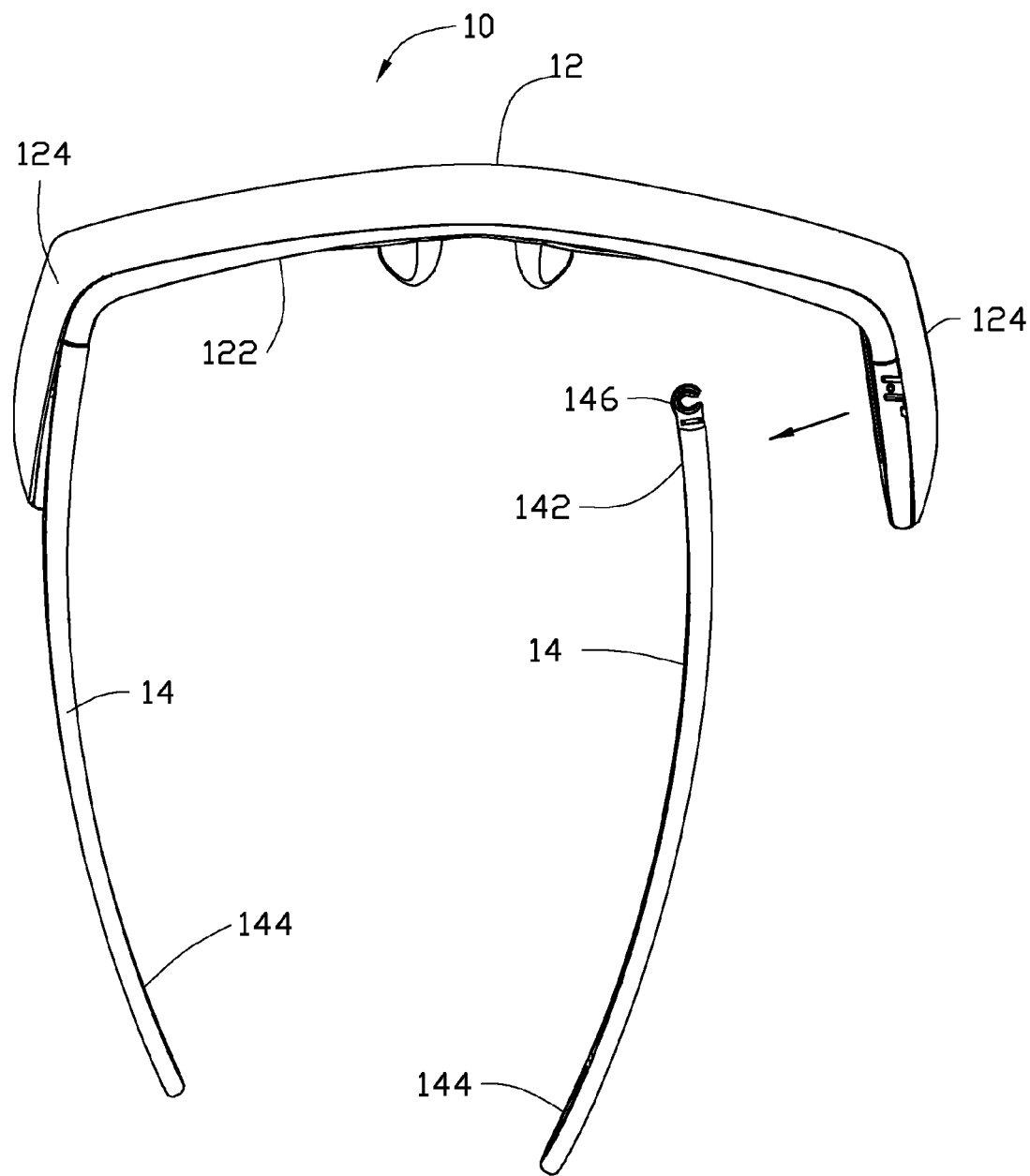
FIG. 5 is a schematic diagram showing a situation of the temple being dislocated from the articulate portion of the 3D glasses of FIG. 1.

The articulate portion 124 comprises a projection 128 located between the axle 126 and the end of the articulate portion 124. While the temple 14 is pivoted outward to reach the articulate portion 124 as shown in FIG. 4, the projection 128 contacts to the temple 14 where is located between the joint extreme 142 and the hanging extreme 144. In the disclosure, the temple 14 is regarded as a lever, wherein, the projection 128 is a fulcrum, the joint extreme 142 is a point of resistance and the hanging extreme 144 is a point of application. By the effect of the lever, as the hanging extreme 144 is enforced by an unexpected external force toward the articulate portion 124 (see the arrow in FIG. 4), a reaction force exerts on the joint extreme 142 contrary to the articulate portion 124 and the aperture 146. A lever arm of the hanging extreme 144 to the projection 128 is longer than that of the joint extreme 142 to the projection 128, by which, the reaction force exerted on the joint extreme 142 is larger than the unexpected external force on the hanging extreme 144. Under an effect of the reaction force exerted on the joint extreme 142, the aperture 1462 may be stretched to exceed the diameter of the axle 126, and then the pivot seat 146 is dislocated from the axle 126 that the temple 14 is also disarticulated from the glasses frame 12, as shown in FIG. 5. By which, it is safety while the pair of the temples 14 being bursted or snapped as them suffered an unexpected impulse can be prevented. If the joint extreme 142 of the pair of temples 14 is immovably fixed on the articulate portion 124 of the glasses frame 12, the temple 14 may be bursted or snapped to lead users to be slashed or sliced as enforced by an unexpected external force toward the articulate portion 124.

Accordingly, the disclosure provides the pair of the 3D glasses 10 having safety device, wherein the pivot seat 146 of the pair of temples 14 is flexible and can be dislocated from the articulate portion 124 of the glasses frame 12 as the pair of temples 14 enforced by an unexpected external force toward the articulate portion 124. Therefore, injury to the user due to the temple 14 being bursted or snapped can be prevented.

It is to be understood, however, that even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A pair of glasses, comprising:
   a glasses frame, comprising two racks and two articulate portions adjacent to the two racks, each of the two articulate portions comprising a projection; and
   a pair of temples, pivotally mounted on the two articulate portions, each of the pair of temples comprising a joint extreme pivotally mounted on the articulate portion by an axle and a hanging extreme opposite to the joint extreme, wherein the joint extreme comprises a pivot seat having an axle bore and an aperture connecting to the axle bore;
   wherein the projection is located between the axle and one end of the articulate portion;
   and the temple is configured to be disarticulated from the glasses frame when the hanging extreme is enforced by an external force.

2. The pair of glasses as claimed in claim 1, wherein the two articulate portions respectively extend from two ends of the glasses frame to form a U-shaped structure.

3. The pair of glasses as claimed in claim 1, wherein the aperture is smaller than a diameter of the axle.

4. The pair of glasses as claimed in claim 3, wherein the pivot seat is flexible that the axle is allowed to be inserted into the axle bore through the aperture.

5. The pair of glasses as claimed in claim 3, while the aperture is stretched to exceed the diameter of the axle, the temple is disarticulated from the glasses frame.

6. The pair of glasses as claimed in claim 1, wherein the glasses is a 3D glasses with a pair of 3D lenses installed into the two racks.

7. The pair of glasses as claimed in claim 1, wherein the pair of temples is pivoted inward in the vicinity of the two racks, the pair of temples is received inside the glasses frame between the two articulate portions.

8. The pair of glasses as claimed in claim 1, wherein the pair of temples is pivoted outward in the vicinity of the articulate portion, an interval is formed between the pair of temples.

9. The pair of glasses as claimed in claim 1, wherein a distance between the hanging extreme and the projection is longer than that of the joint extreme and the projection.

10. The pair of glasses as claimed in claim 1, wherein the temple is a lever structure, and the projection is a fulcrum of the lever.

11. A pair of 3D glasses, comprising:
    a glasses frame, comprising two racks and two articulate portions adjacent to the two racks, each of the two articulate portions comprising a projection;
    a pair of 3D lenses, inserted into the two racks; and
    a pair of temples, pivotally mounted on the two articulate portions, each of the pair of temples comprising a joint extreme pivotally mounted on the articulate portion by an axle and a hanging extreme opposite to the joint extreme, wherein the joint extreme comprises a pivot seat having an axle bore and an aperture connecting to the axle bore;
    wherein the projection is located between the axle and one end of the articulate portion;
    wherein when the hanging extreme is enforced by an external force, the pair of temples is capable of being dislocated from the glasses frame.

12. The pair of glasses as claimed in claim 11, wherein the temple is a lever structure, and the projection is a fulcrum of the lever.

13. The pair of glasses as claimed in claim 11, wherein the two articulate portions respectively extend from two ends of the glasses frame to form a U-shaped structure.

14. The pair of glasses as claimed in claim 11, wherein the aperture is smaller than a diameter of the axle.

15. The pair of glasses as claimed in claim 14, wherein the pivot seat is flexible that the axle is allowed to be inserted into the axle bore through the aperture.

16. The pair of glasses as claimed in claim 14, while the aperture is stretched to exceed the diameter of the axle, the temple is disarticulated from the glasses frame.

17. The pair of glasses as claimed in claim 11, wherein the pair of temples is pivoted inward in the vicinity of the two racks, the pair of temples is received inside the glasses frame between the two articulate portions.

18. The pair of glasses as claimed in claim 11, wherein the pair of temples is pivoted outward in the vicinity of the articulate portion, an interval is formed between the pair of temples.

19. The pair of glasses as claimed in claim 11, wherein a distance between the hanging extreme and the projection is longer than that of the joint extreme and the projection.

* * * * *